March 24, 1931.   O. R. SCHOENROCK   1,797,515
CLUTCH
Filed March 15, 1929    2 Sheets-Sheet 1
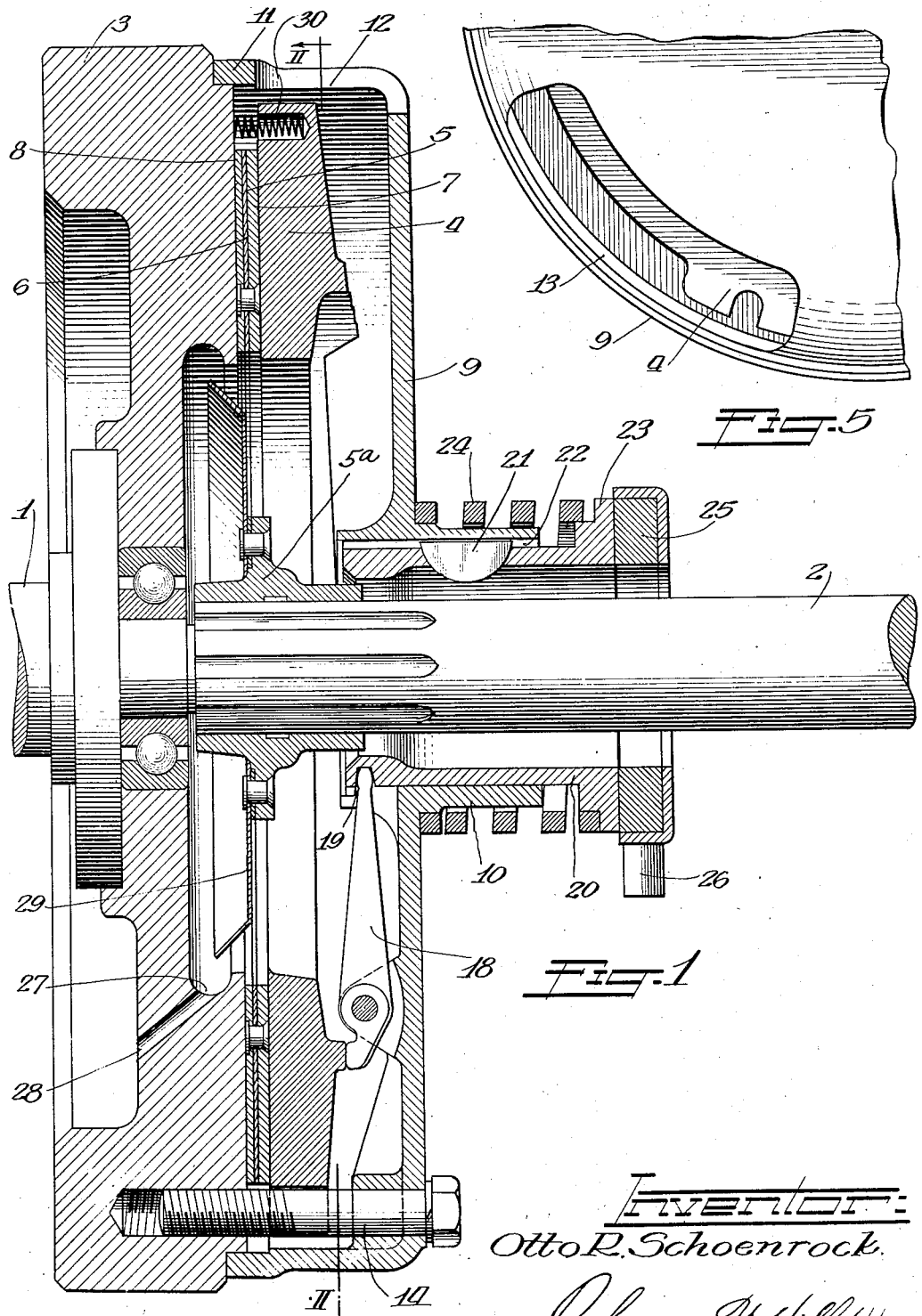
Inventor:
Otto R. Schoenrock.
by: Charles T. Hill March 24, 1931.    O. R. SCHOENROCK    1,797,515
CLUTCH
Filed March 15, 1929    2 Sheets-Sheet 2
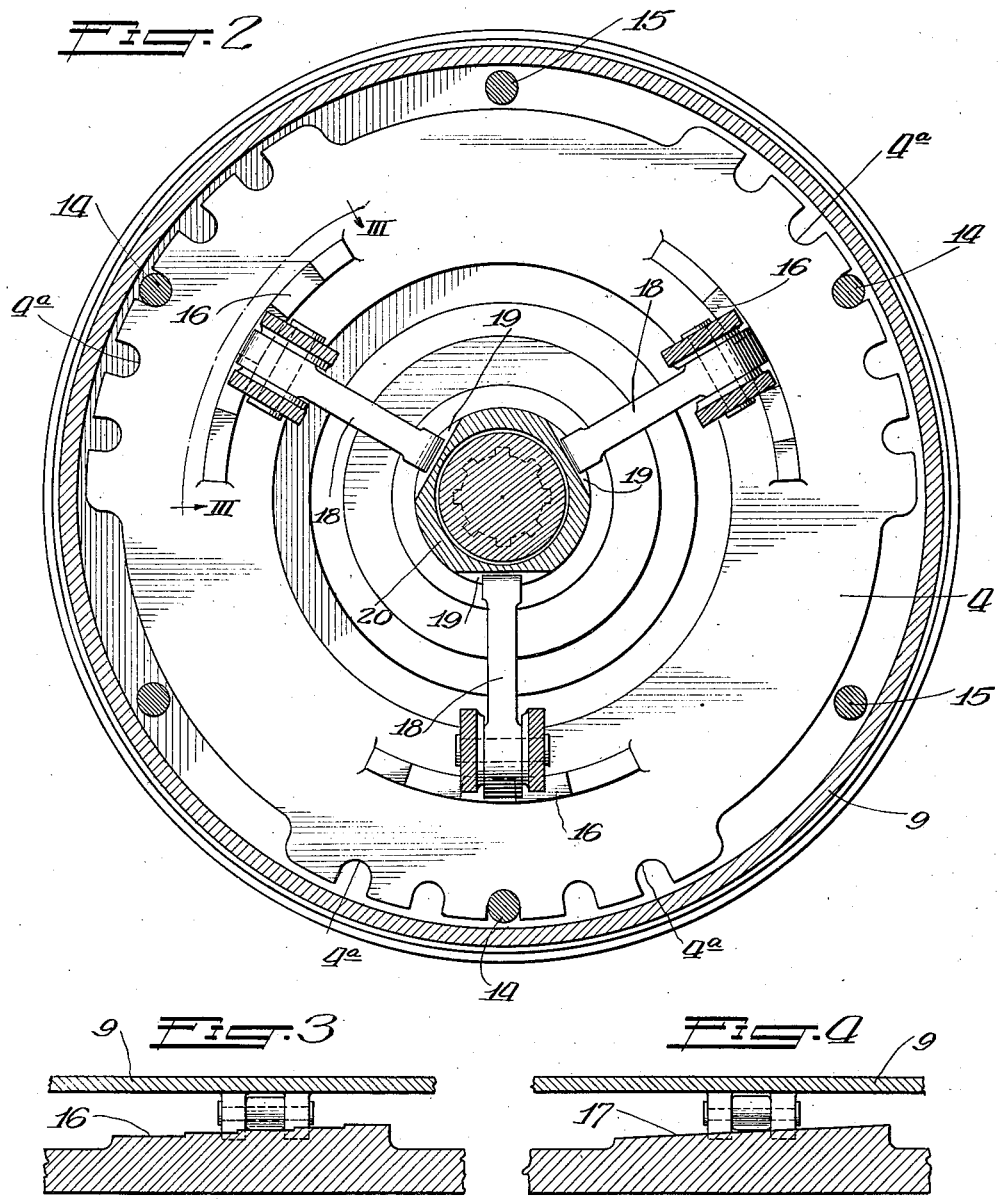

Patented Mar. 24, 1931

1,797,515

UNITED STATES PATENT OFFICE

OTTO R. SCHOENROCK, OF CHICAGO, ILLINOIS

CLUTCH

Application filed March 15, 1929. Serial No. 347,210.

This invention relates to a clutch for vehicles and is primarily designed for use in automobiles in which the clutch actuating lever has a constant throw.

It is an object of this invention to provide an adjustable pressure plate which may be adjusted without removing the casing to compensate for wear whereby the clutch actuating lever will always perform its function.

It is a further object of this invention to provide means for readily separating the pressure plate from the friction plate.

It is also an object of this invention to provide means for ventilating the clutch and for controlling the lubricant thereof.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a sectional view through a clutch involving this invention.

Figure 2 is a sectional view taken upon the line II—II of Figure 1.

Figure 3 is a sectional view taken upon the line III—III of Figure 2.

Figure 4 is a sectional view similar to Figure 3 illustrating a slight modification of certain features.

Figure 5 is a fragmentary front elevational view of the casing for the clutch illustrating a ventilating aperture therein.

In the drawings, there is shown a driving shaft 1 which may be the crankshaft which is driven by an engine. In alignment with the crankshaft 1 there is a driven shaft 2 which constitutes a part of the transmission. A flywheel 3 is secured upon the crankshaft 1 and constitutes a driving member. Spaced from and parallel with the inner face of the flywheel is a clutch driving member or pressure ring 4. Between the flywheel 3 and the driving member 4 there is a friction disc 5. This friction disc 5 preferably consists of a central steel plate 6 with an asbestos lining or plate 7 upon one side and another asbestos lining or plate 8 upon the other side. This friction disc or plate is riveted to a hub 5a slidably keyed or splined on the driven shaft 2. A casing 9 provided with a hub 10 and an integral flange 11 that overlaps the rabbeted edge of the flywheel encloses the driving member 4. The casing 9 may be provided with ventilating apertures 12 as shown in Figure 1 and may also be provided with ventilating slots 13 as shown in Figure 5.

The aforementioned casing member 9 is secured to the flywheel 3 by means of a plurality of screw bolts. In referring to Figure 2, it will be noted that the pressure ring 4 has a plurality of U-shaped notches 4a upon its periphery. In the present instance the notches 4a are shown as consisting of three spaced series. The arrangement is such that a plurality of screw bolts pass between the series of notches and a plurality pass through these notches whereby the pressure ring 4 is held against rotation by the screw bolts. In the present instance three screw bolts 14 are shown as passing through the notches of the pressure ring 4 and three screw bolts 15 are shown as passing through the spaces between the series of notches. Obviously, when the screw bolts 14 are removed it will be possible to rotate the pressure ring 4 for a purpose that will later appear. The outer face of the pressure ring 4 is provided with a plurality, three in the present instance, of stepped ridges 16 as shown more clearly in Figure 3. If desirable the stepped surfaces may be eliminated and in place thereof a cam surface 17 as shown in Figure 4 may be used. Upon the inner surface of the casing 9 there are pivoted a plurality of clutch actuating levers 18. It will be noted that the inner surface of the casing 9 is provided with suitable ears to which the levers 18 are pivoted. The outer end of each lever 18 projects a short distance beyond its pivot as shown in Figure 1 and contacts the raised surface 16. The inner end of each lever 18 projects into a notch or groove 19 in a slidable sleeve member 20 that surrounds the driven shaft 2. The slidable sleeve member 20 telescopes within the hub or flange 10 of the casing 9. A key 21 secured in the sleeve 20 extends into a groove 22 in the hub 10 of the casing with the result that the casing is keyed to the sleeve 20 against relative rotation. However, the sleeve 20 can slide inwardly and outwardly with respect to the casing for actuating the clutch levers 18. The outer end of the sleeve 20 is provided with an annular shoulder 23 and a coiled spring 24 surrounds the sleeve and is confined between the casing 9 and the shoulder 23 for sliding the sleeve 20 in an outward direction for applying the clutch levers 18 to inwardly move the pressure ring 4 and the friction plate 5 for frictionally clamping the latter between the pressure ring 4 and the flywheel 3 for rotating the shaft. A collar 25 abuts the outer end of the sleeve 23. The collar 25 is provided with a lug 26 which is adapted to be connected to the usual foot lever (not shown) for releasing the clutch.

The flywheel 3 is provided with an interior annular groove 27 for receiving lubricant that drops from the bearings and this groove may be connected with outlet conduits 28 which extend through the flywheel. In connection therewith an oil guard or disc 29 is preferably secured to the plate 6 of the friction disc 5, as best illustrated in Figure 1. It will be noted that this oil guard 29 is dish-shaped and its purpose is to prevent the oil or lubricant from splashing beyond the flywheel and causing the lubricant to gravitate or fly into the groove 28.

In order that the pressure ring 4 may be readily and quickly disengaged from the friction plate, suitable coiled springs 30 may be inserted between the flywheel 3 and the pressure ring 4. A simple way of inserting these springs 30 consists in providing suitable sockets in the pressure ring 4 for containing the springs.

The operation of this form of clutch is sufficiently obvious without any further description. It may, however, be mentioned that when the sleeve member 20 is pushed inwardly by the foot lever of the automobile, the clutch levers 18 are actuated for releasing the clutch. When the foot pedal is released the spring 24 will automatically shift the sleeve 20 in an outward direction and effect engagement of the clutch.

It will be appreciated that the foot pedal in an automobile usually has a constant throw with the result that if the clutch becomes worn it can no longer be effectively actuated or controlled by such foot pedal. In order to overcome this objetcion, it is only necessary to remove the three screw bolts 14 and rotate the pressure ring 4 and vary the stepped surface 16 upon which the levers 18 act. Assuming that the clutch has worn and the throw of the clutch pedal is too short to effectively control the clutch, the pressure ring 4 will be rotated to bring a steeper step in contact with each lever 18, thereby compressing the clutch spring 24. This rotation may be effected by inserting a tool thru a bolt or ventilating opening.

It will be noted that only three screws have to be removed from the casing member in the present instance and, that a number of screws still secure the casing member 9 in place. It is, therefore, possible to adjust the clutch without removing the casing. A great deal of time and labor is hence saved in effecting the adjustment of the clutch.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a clutch, a driving member, a second driving member having progressively increasing ridges, actuating means for said second driving member engaging said ridges, a casing enclosing said second driving member and attached to said first mentioned driving member, said casing having an aperture therein to permit adjustment of said second driving member without removing the same.

2. In a clutch, a driving member, a second driving member having a series of notches in its periphery and progressively increasing ridges upon one face, levers engaging said ridges, a casing enclosing said second driving member, and bolts connecting said casing and first mentioned driving member, certain of said bolts passing thru notches of said series, whereby the removal of said bolts will disengage said second driving member for rotation.

3. In a clutch, a driving member, a second driving member having a plurality of spaced series of notches upon its periphery, and a plurality of progressively increasing ridges upon one face, levers engaging said ridges, a casing enclosing said second driving member, bolts connecting said casing to said first mentioned driving member, a number of said bolts passing thru said notches and a number passing between the series of notches for the purpose set forth.

4. In a clutch, a plurality of driving members, friction means between said driving members, a casing enclosing one of said driving members, means for securing the casing to the other of said members, and removable means extending through said casing and one of said members and connected to the other of said members for permitting adjustment of one of said members without necessitating the removal of said casing.

5. In a clutch, a driving member, a pressure ring having a plurality of progressively stepped segmentary ridges upon one face thereof, friction means between said driving member and said ring, a casing enclosing said ring and connected to said driving member, levers pivotally secured to said casing and engaging said ridges, and removable means extending through said casing and said ring and connected to said member for permitting adjustment of said ring without requiring adjustment of said casing.

6. In a clutch, a driving member, a second driving member, friction means between said driving members, a casing enclosing said second driving member, bolts for securing said casing to said first mentioned driving member, certain of said bolts engaging said second driving member for preventing rotation thereof, and other of said bolts allowing rotation of said second driving member whereby the removal of said certain bolts allows rotation of said second member without removing said casing.

7. In a clutch, a plurality of driving members, a driven member between said driving members, a casing enclosing one of said driving members, bolts extending through said casing and into the other of said driving members, said enclosed driving member having a series of notches through which a plurality of said bolts pass, and an elongated recess through which another bolt passes.

8. In a clutch, a plurality of driving members, friction means between said driving members, a casing enclosing one of said driving members, means for securing said casing to the other of said driving members, said means passing through said enclosed driving member but allowing rotation thereof, and removable means extending into said enclosed driving member for permitting adjustment of said enclosed driving member without necessitating the removal of said casing.

9. In a clutch, a driving member, a pressure plate associated therewith, driven means between said member and said plate, a casing enclosing said plate, means for securing said casing to said member but allowing rotation of said plate, and other removable means extending through said casing and engaging said plate to prevent rotation thereof, said removable means permitting adjustment of said plate without removing said casing.

In testimony whereof I have hereunto subscribed my name at Chicago, Cook County, Illinois.

OTTO R. SCHOENROCK.